United States Patent
Chien

(10) Patent No.: US 6,216,888 B1
(45) Date of Patent: Apr. 17, 2001

(54) MAGNETIC RACK

(76) Inventor: Chun Mei Chien, No. 188, Wu Kuang Rd., Wu Jih Hsiang, Taichung Hsien (TW)

( * ) Notice: Subject to any disclaimer, the term of this patent is extended or adjusted under 35 U.S.C. 154(b) by 0 days.

(21) Appl. No.: 09/635,064

(22) Filed: Aug. 9, 2000

(51) Int. Cl.⁷ ........................................................ A47F 5/00
(52) U.S. Cl. .................... 211/87.01; 211/DIG. 1; 211/70.6; 211/70.7; 248/309.4; 248/206.3; 248/206.5
(58) Field of Search ................................ 211/DIG. 1, 70.6, 211/70.7, 87.01; 248/309.4, 205.5, 206.3, 206.5, 37.6

(56) References Cited

U.S. PATENT DOCUMENTS

| | | | |
|---|---|---|---|
| D. 253,144 | * | 10/1979 | Heckler . |
| D. 253,150 | * | 10/1979 | Heckler . |
| 2,314,803 | * | 3/1943 | Wagner et al. . |
| 2,565,624 | * | 8/1951 | Phelon . |
| 2,712,709 | * | 7/1955 | Pulrang . |
| 3,195,021 | * | 7/1965 | Martin . |
| 3,229,820 | * | 1/1966 | Hentzi et al. . |
| 3,774,773 | * | 11/1973 | Brent ........................ 211/DIG. 1 X |
| 3,776,387 | * | 12/1973 | Brent ........................ 211/DIG. 1 X |
| 3,827,021 | * | 7/1974 | Phelon ........................ 248/206.5 X |
| 5,301,822 | * | 4/1994 | Coleman et al. .................... 211/70.6 |

* cited by examiner

Primary Examiner—Robert W. Gibson, Jr.
(74) Attorney, Agent, or Firm—Rosenberg, Klein & Lee

(57) ABSTRACT

A magnetic rack including a casing formed with an internal receiving chamber in which a magnetic unit is received. The magnetic unit is composed of a magnet and two iron strips respectively attracted by and attached to two sides of the magnet. Each iron strip has a projecting section protruding from the magnet. The top face of the receiving chamber is formed with a slit corresponding to each projecting section of the iron strip, whereby only the projecting section of the iron strip outward protrudes from the casing. A bottom board is disposed on bottom face of the casing for enclosing and fixing the magnetic unit in the receiving chamber of the casing.

9 Claims, 17 Drawing Sheets

MAGNETIC RACK

BACKGROUND OF THE INVENTION

The present invention relates to a magnetic rack which can be easily assembled and firmly fixed. The magnetic rack is not subject to deformation caused by humidity. Also, the magnetic rack has beautiful appearance.

FIGS. 15 to 17 show a conventional magnetic rack including a wooden main body 8 formed with two channels 81 and two magnetic units 9 respectively installed in the channels 81. Each magnetic unit 9 is composed of a magnet 91 and two iron strips 92. When assembled, the magnet 91 is first adhered with the iron strips 92 by an adhesive. Then the magnetic units 9 are adhered in the channels 81 of the main body 8. The iron strips 92 slightly protrude from the main body 8 and the magnet 91 for attracting metallic tools, etc. The main body 8 is formed with several through holes 82 for bolts 83 to pass therethrough and lock the magnetic rack on a fixed article (such as a wall, cabinet, bench, etc.).

In manufacturing, the magnets 91 and the iron strips 92 and the magnetic units 9 and the main body 8 must be adhered to each other by the adhesive. Such procedure is quite troublesome and time-consuming so that the production efficiency can be hardly promoted. Furthermore, in the case that the magnetic unit 9 is loosely fitted in the channel 81, it will be easier to mount the magnetic unit 9. However, under such circumstance, the fixing force for the magnetic unit 9 will be insufficient and the magnetic unit 9 tends to detach from the main body 8 and drop down. In the case that the magnetic unit 9 is tightly fitted in the channel 81, the fixing force for the magnetic unit 9 will be increased. However, it will be uneasy to mount the magnetic unit 9 and the production efficiency will be affected. In addition, the magnets 91 are exposed to external side so that the black magnets 91 will affect the entire appearance of the magnetic rack.

Moreover, when mounted in a humid environment such as a kitchen, the wooden main body 8 of the magnetic rack tends to deform or even crack and damage.

In addition, the end faces of the iron strips 92 are totally attached to the metallic tools. When a kitchen tool such as a cutting knife is attracted by the iron strips 92, since water often remains on the cutting knife after washed, the remaining water will accumulate on the iron strips 92. As a result, after a long period of use, the iron strips 92 tend to rust. This leads to hygienic problem in use of the cutting knife.

SUMMARY OF THE INVENTION

It is therefore a primary object of the present invention to provide a magnetic rack in which the magnetic units are enclosed and fixed in the receiving chambers of the casing and only the projecting sections of the iron strips of the magnetic units extend through the slits of the casing to protrude from the casing. The magnetic units are firmly fixed in the receiving chambers of the casing without using any adhesive. Therefore, it is easy to assemble the magnetic rack the appearance of the magnetic rack as a whole will not be affected.

According to the above object, the magnetic rack of the present invention includes a casing composed of an upper cover and a lower cover. The casing is formed with over one internal receiving chamber in which a magnetic unit is received. The magnetic unit is composed of a magnet and two iron strips respectively attracted by and attached to two sides of the magnet. Each iron strip has a projecting section protruding from the magnet. Each projecting section has over one notch. The receiving chamber is formed with a slit corresponding to each projecting section of the iron strip, whereby only the projecting section of the iron strip outward protrudes from the casing. After the upper and lower covers are mated with each other, the magnetic units are enclosed and fixed in the casing.

The present invention can be best understood through the following description and accompanying drawings wherein:

DETAILED DESCRIPTION OF THE PREFERRED EMBODIMENTS

Figure 1:
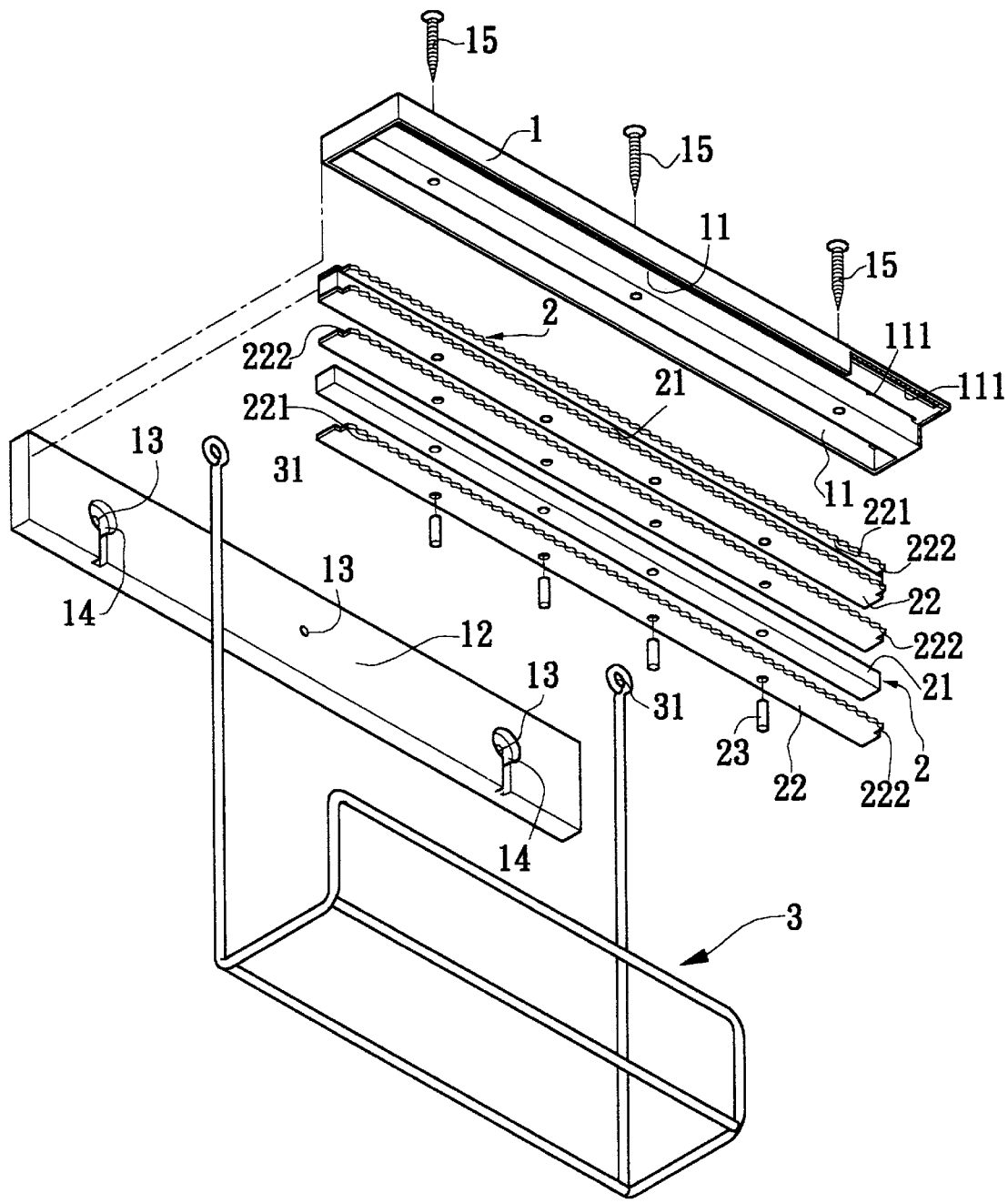
FIG. 1 is a perspective exploded view of a first embodiment of the present invention.
Figure 2:
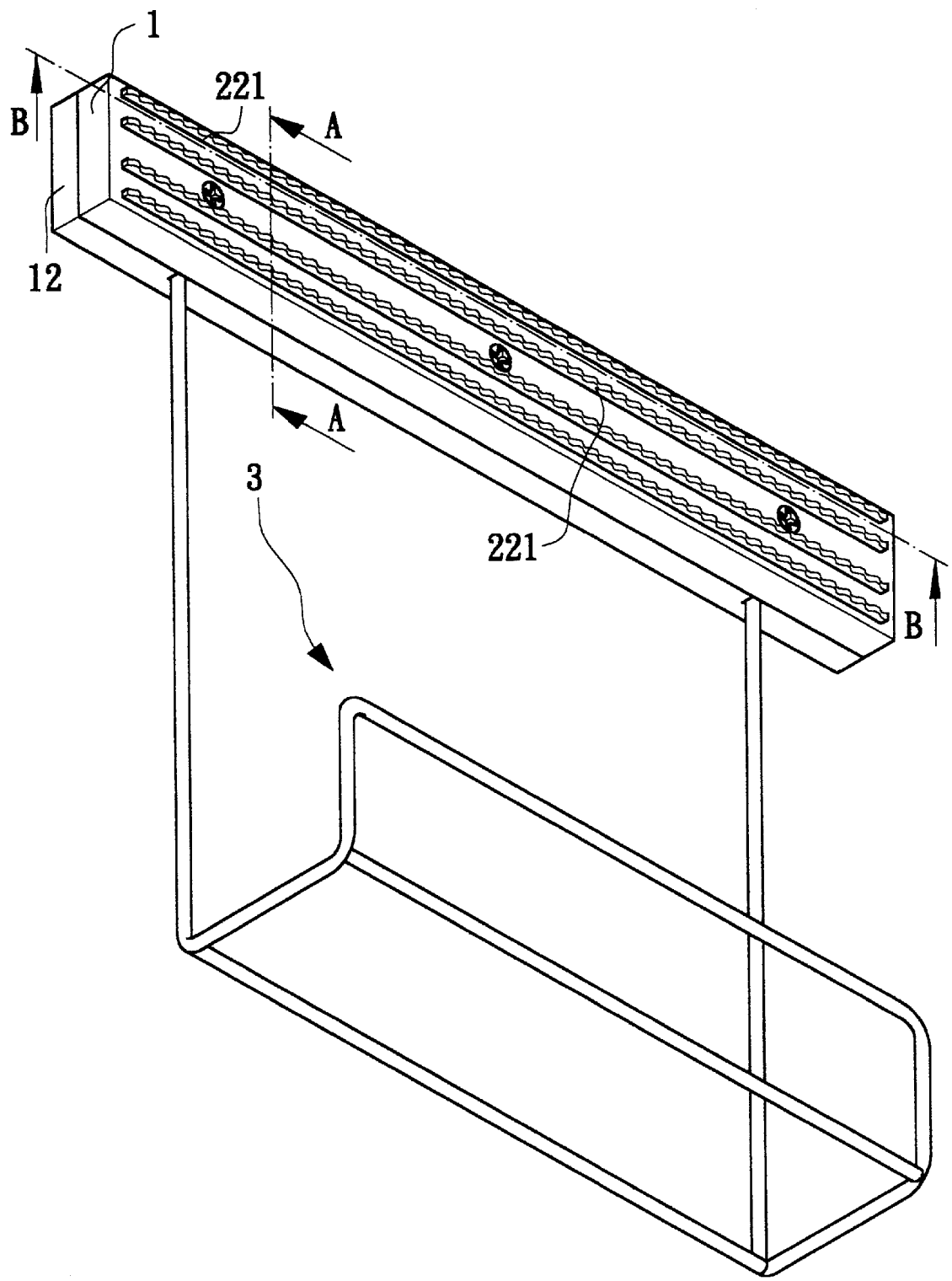
FIG. 2 is a perspective assembled view of the first embodiment of the present invention.
Figure 3:
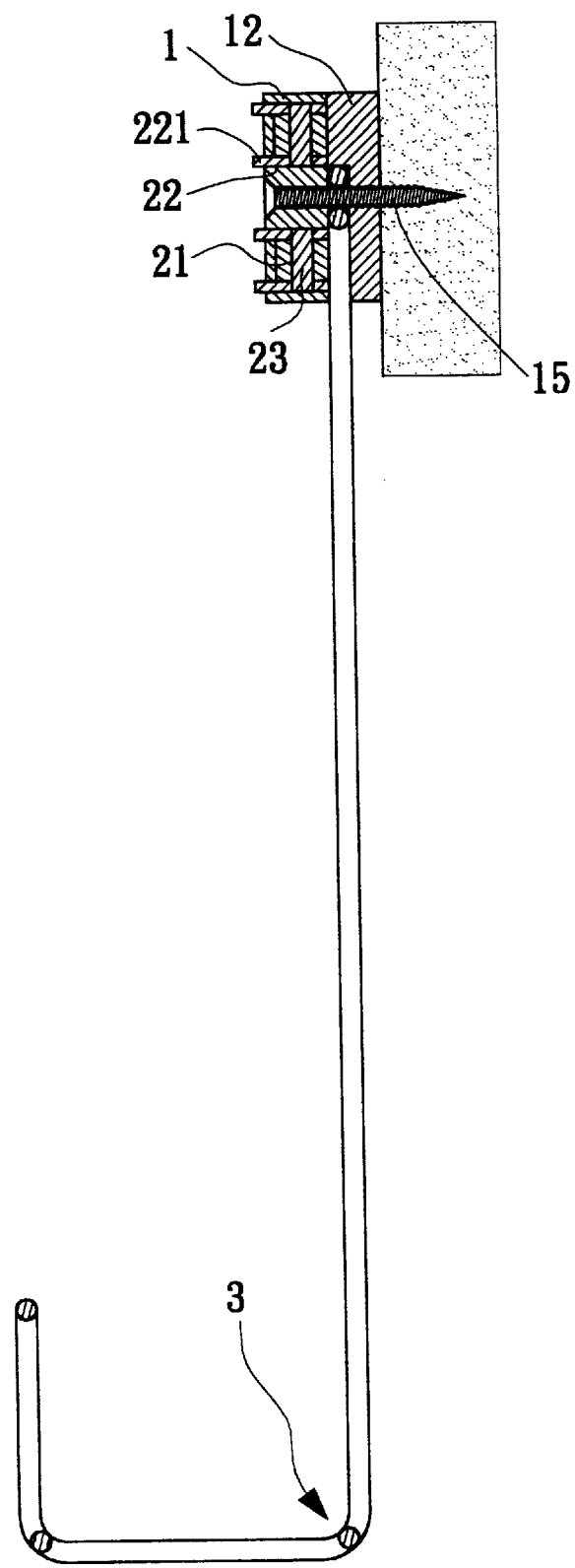
FIG. 3 is a sectional view taken along line A—A of FIG. 2.
Figure 4:
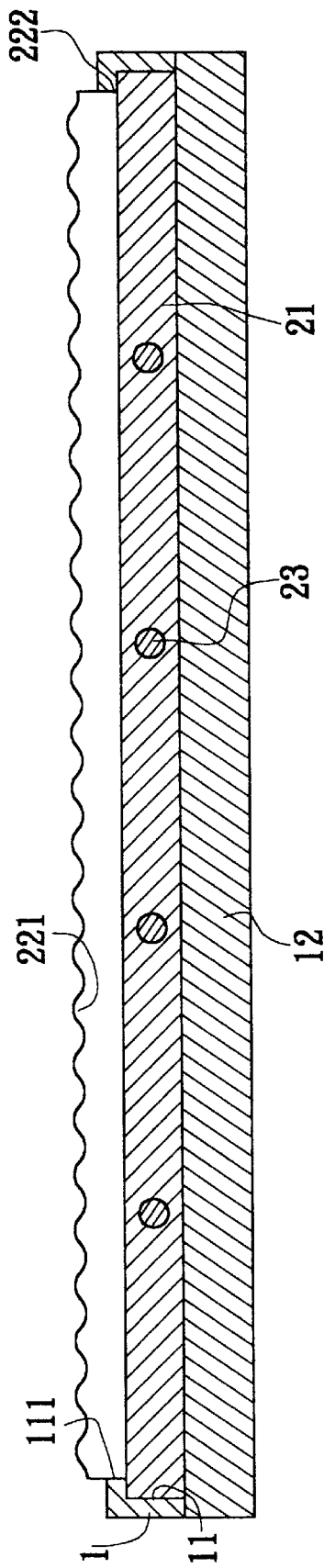
FIG. 4 is a sectional view taken along line B—B of FIG. 2.
Figure 5:
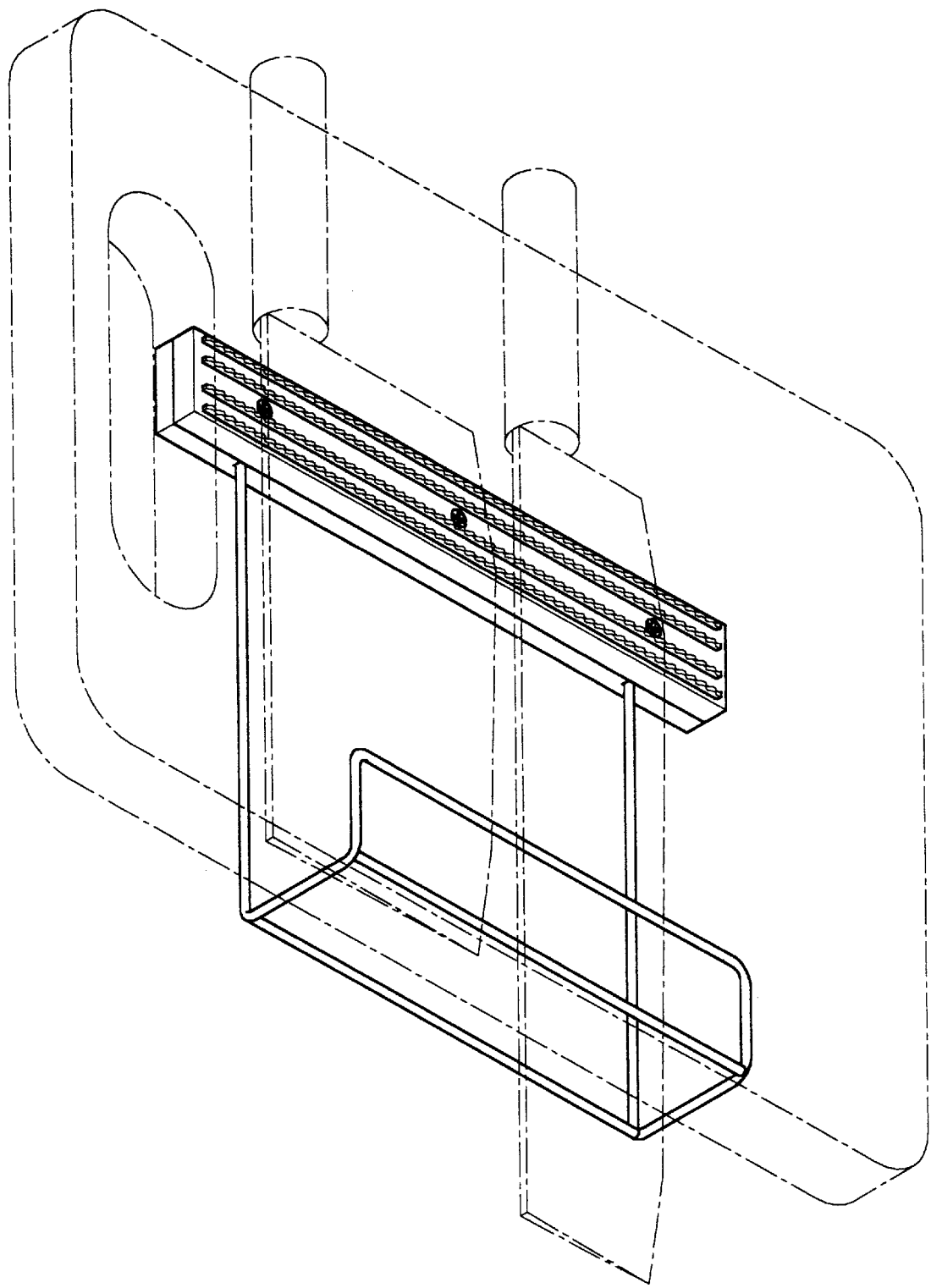
FIG. 5 shows the use of the first embodiment of the present invention.
Figure 6:
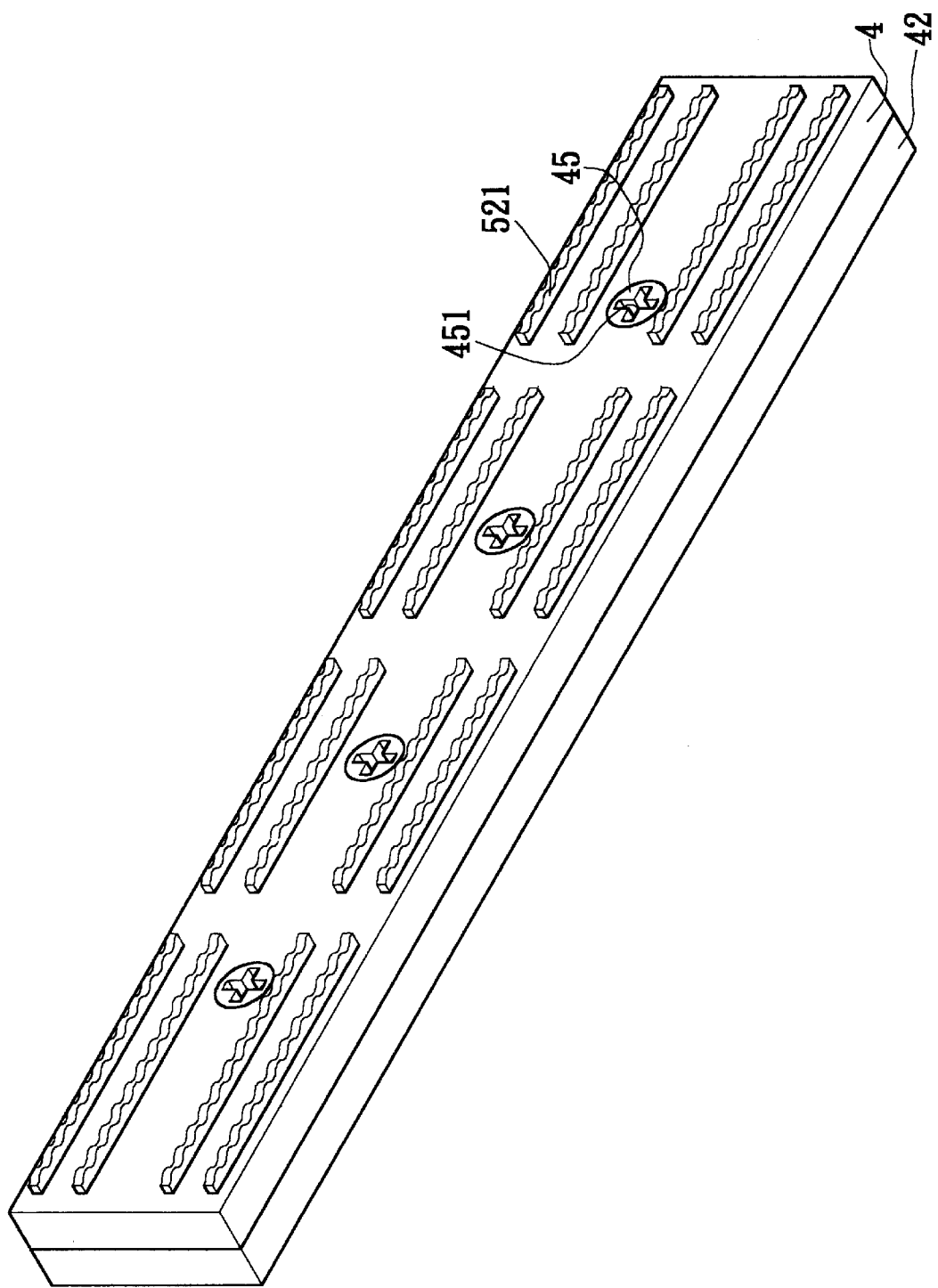
FIG. 6 is a perspective assembled view of a second embodiment of the present invention.
Figure 7:
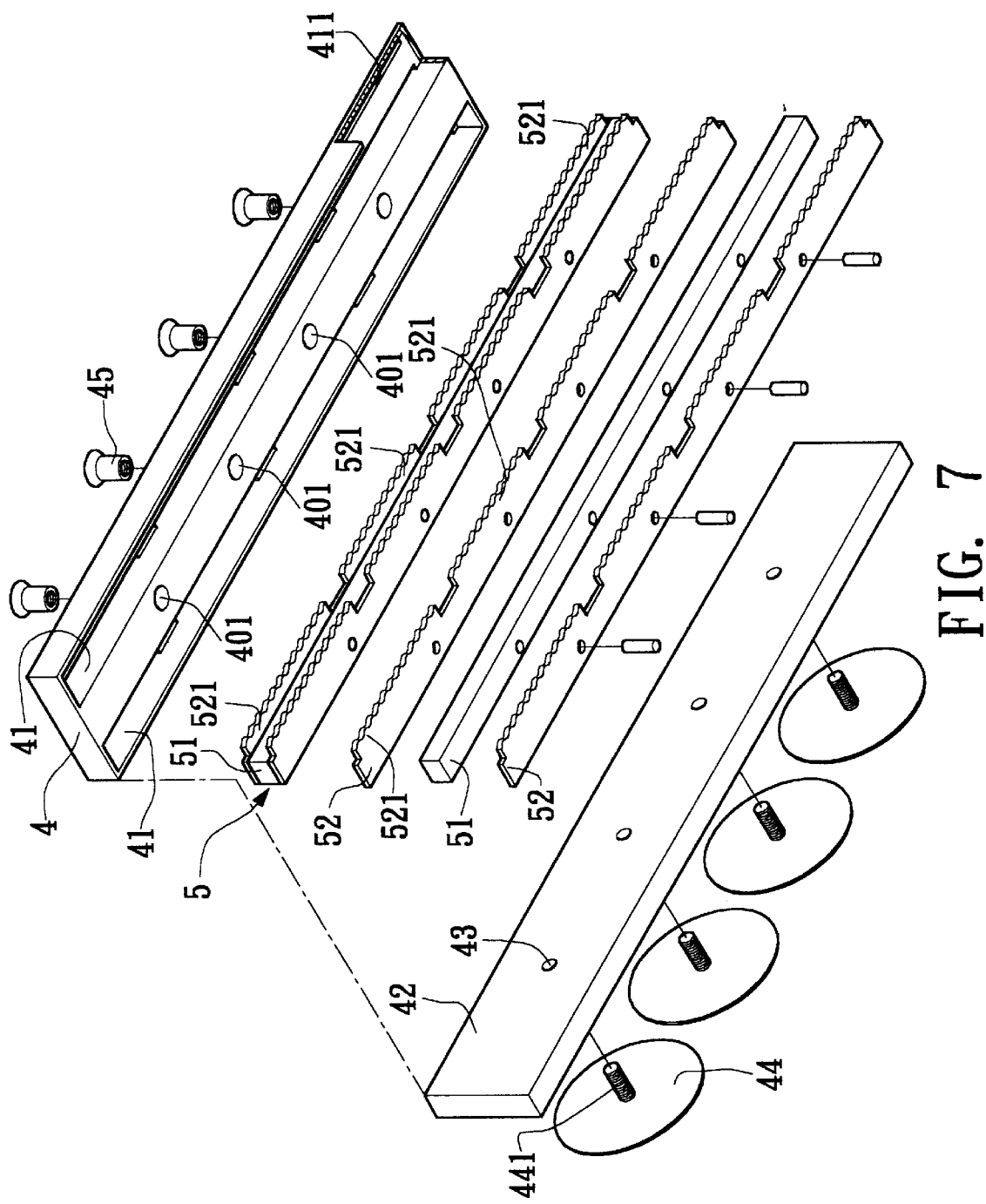
FIG. 7 is a perspective exploded view of the second embodiment of the present invention.
Figure 8:
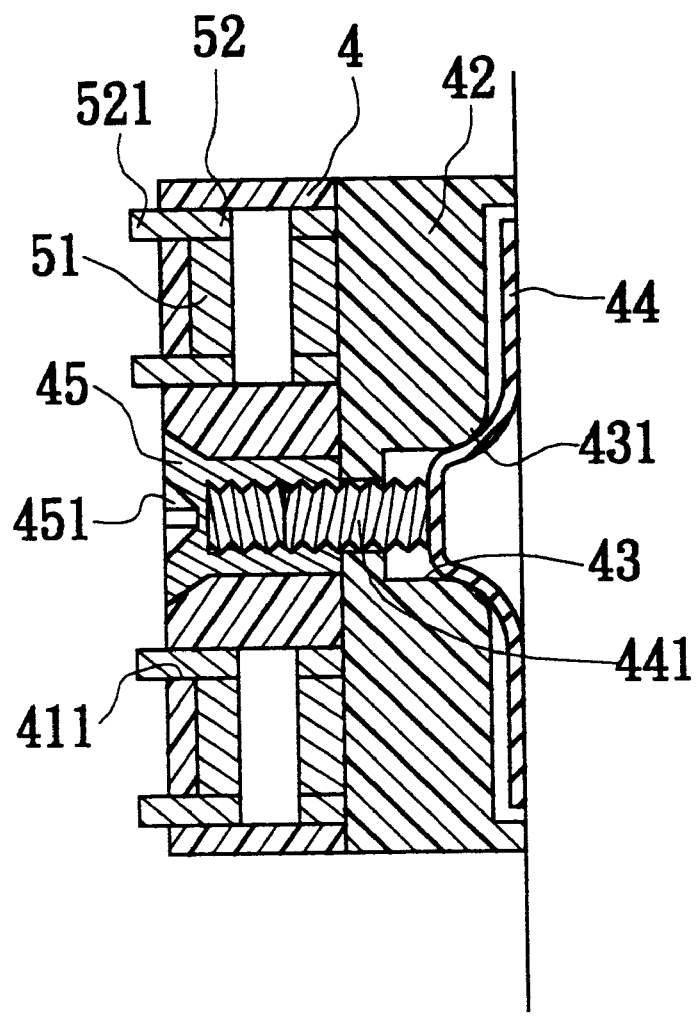
FIG. 8 is a sectional view showing that the second embodiment of the present invention sucks and attaches to an enameled tile.
Figure 9:
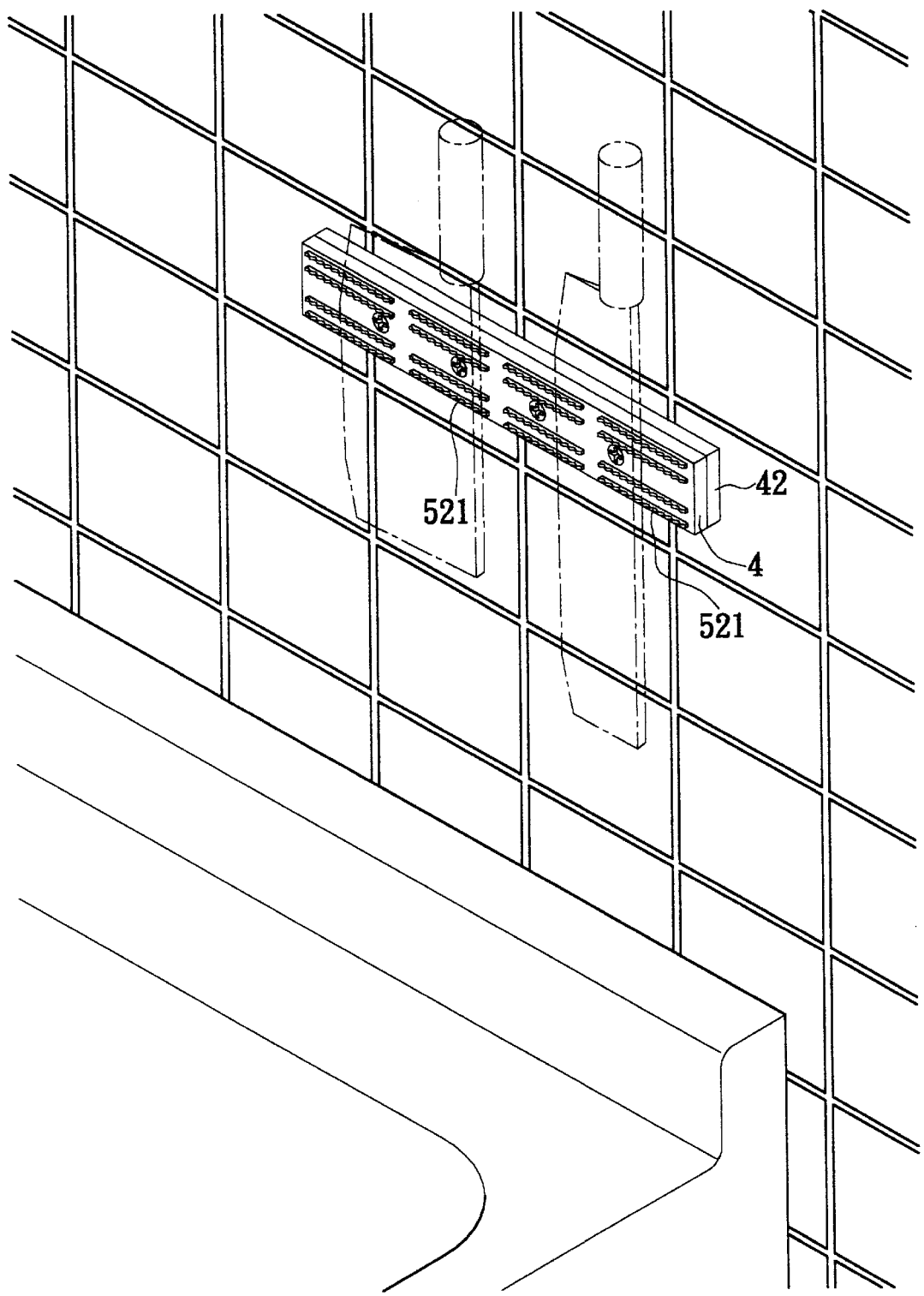
FIG. 9 shows the use of the second embodiment of the present invention.
Figure 10:
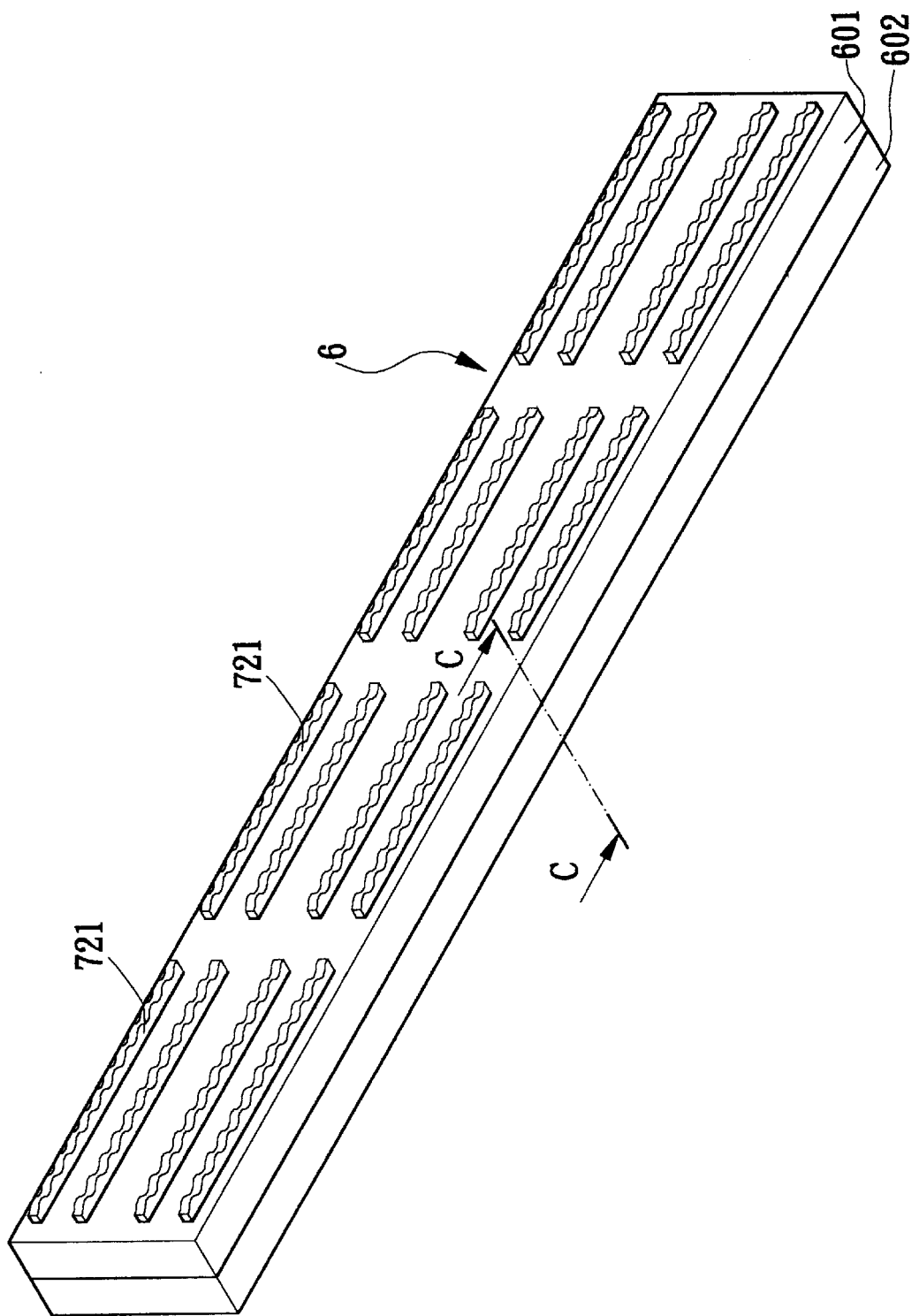
FIG. 10 is a perspective assembled view of a third embodiment of the present invention.
Figure 11:
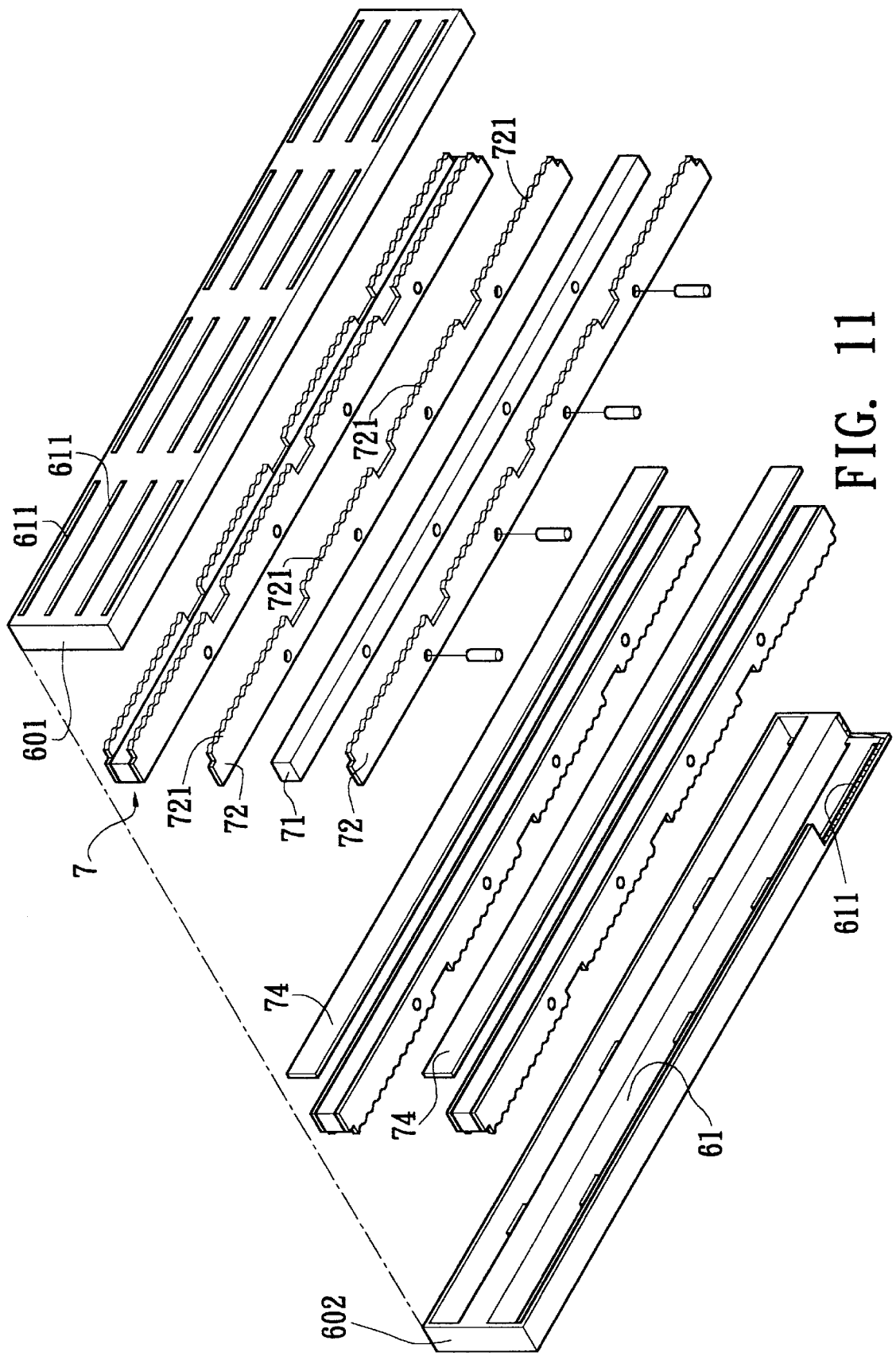
FIG. 11 is a perspective exploded view of the third embodiment of the present invention.
Figure 12:
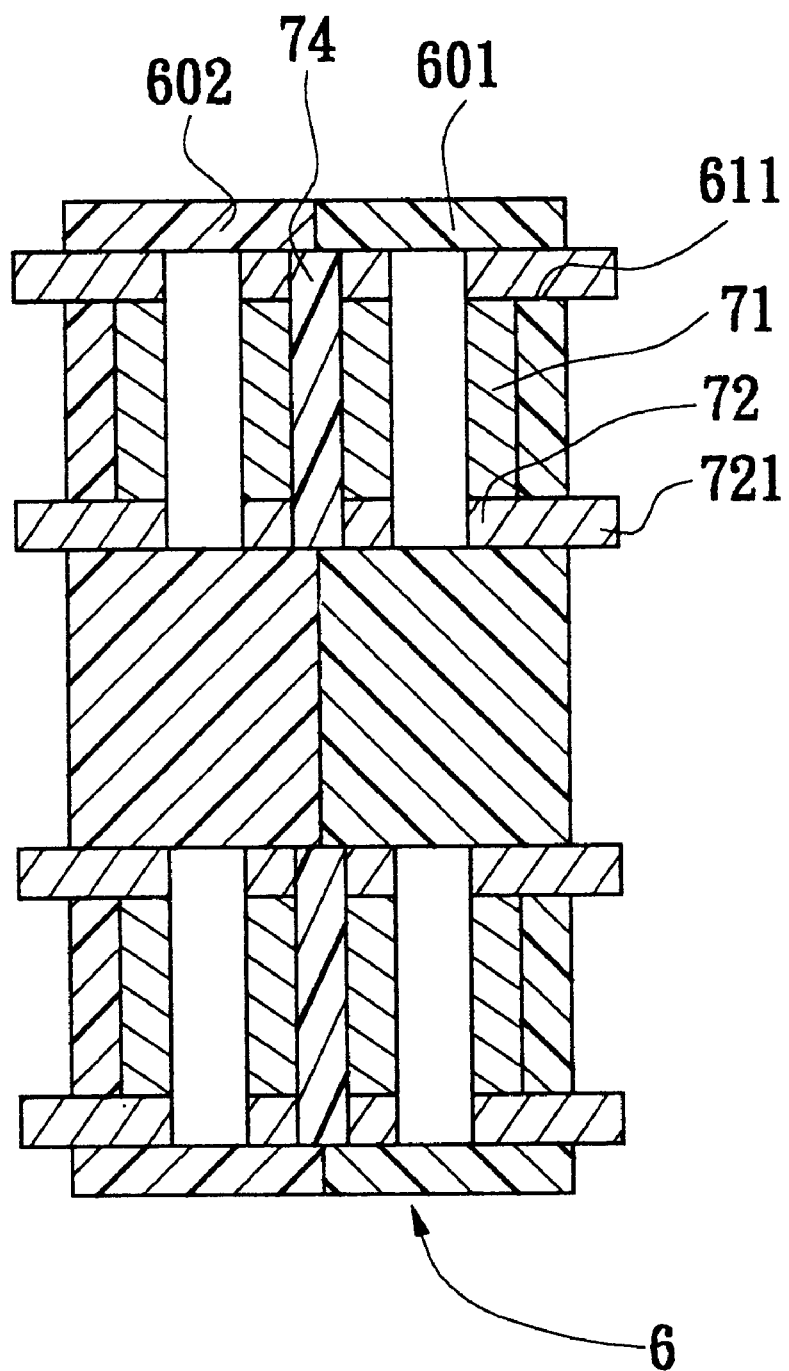
FIG. 12 is a sectional view taken along line C—C of FIG. 10.
Figure 13:
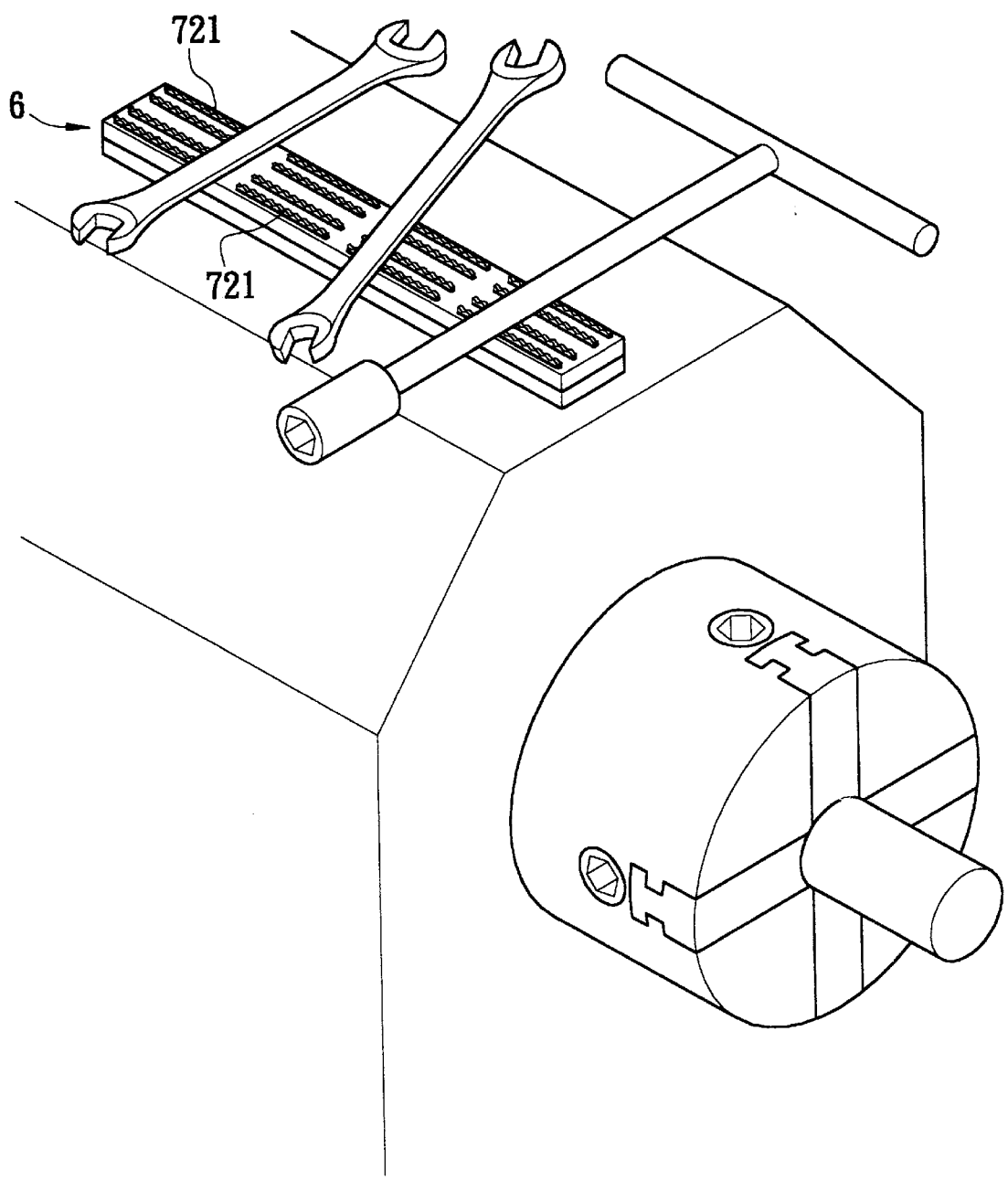
FIG. 13 shows that the third embodiment of the present invention is attached to a working bench.
Figure 14:
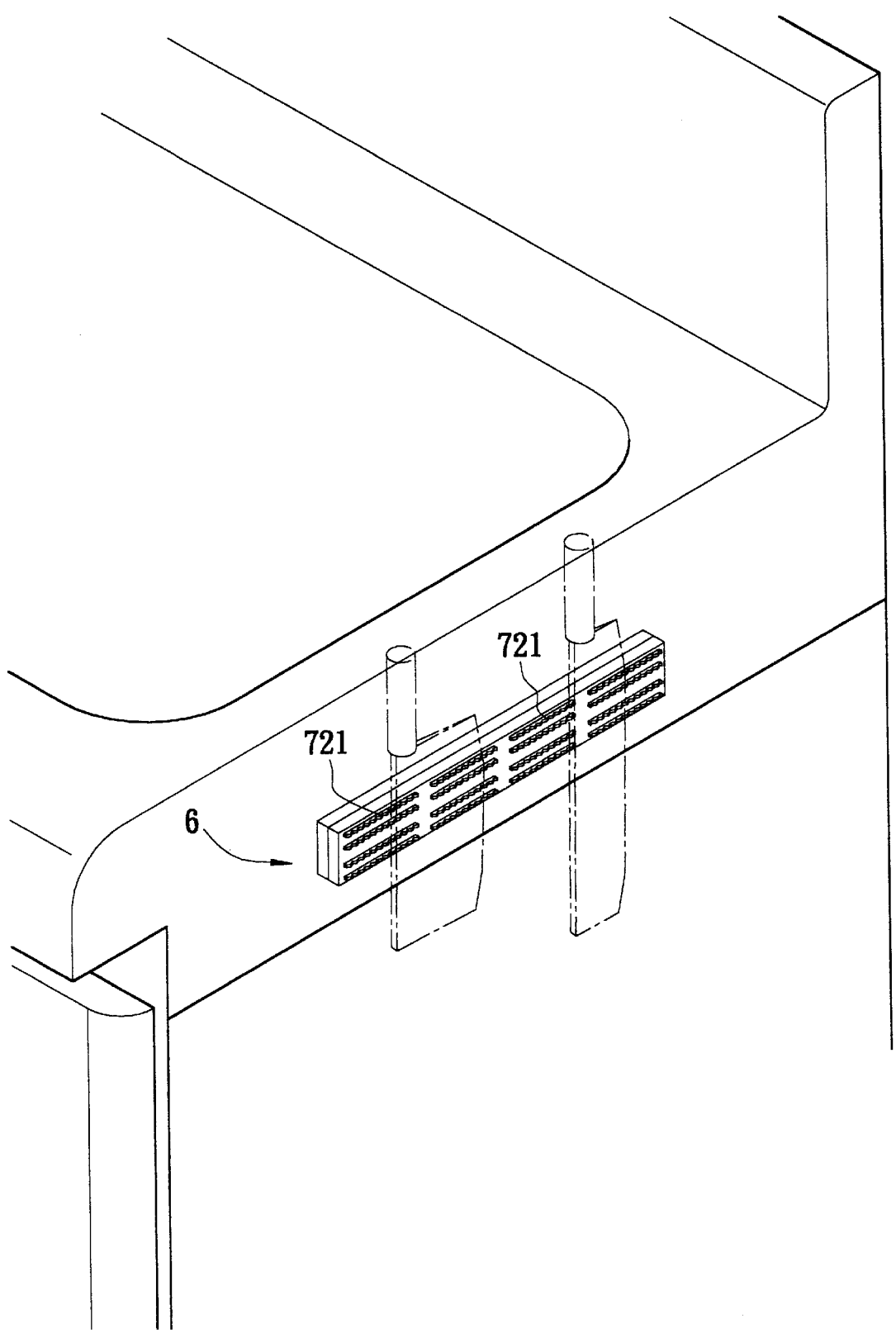
FIG. 14 shows that the third embodiment of the present invention is attached to a stainless steel kitchen cabinet.
Figure 15:
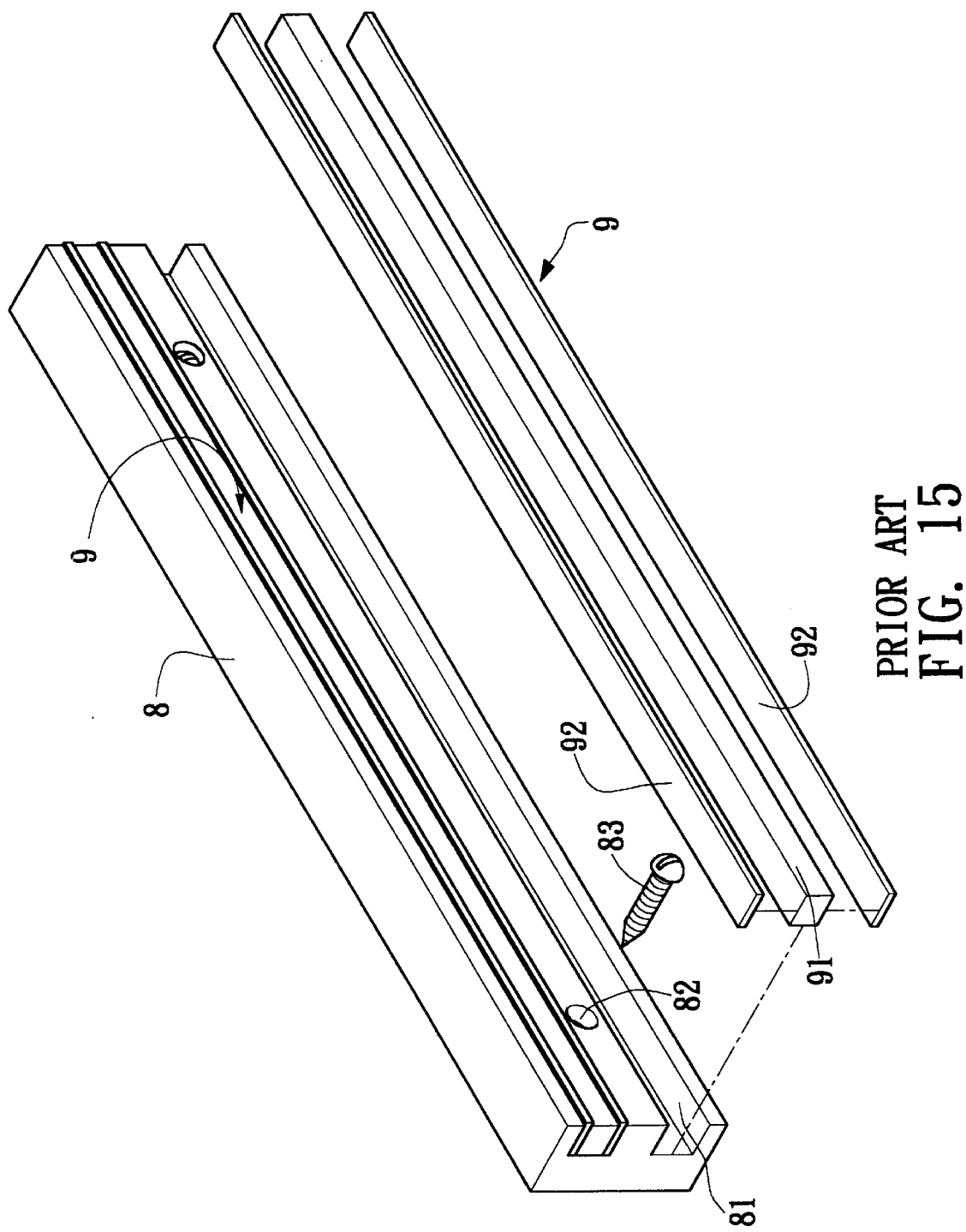
FIG. 15 is a perspective exploded view of a conventional magnetic rack.
Figure 16:
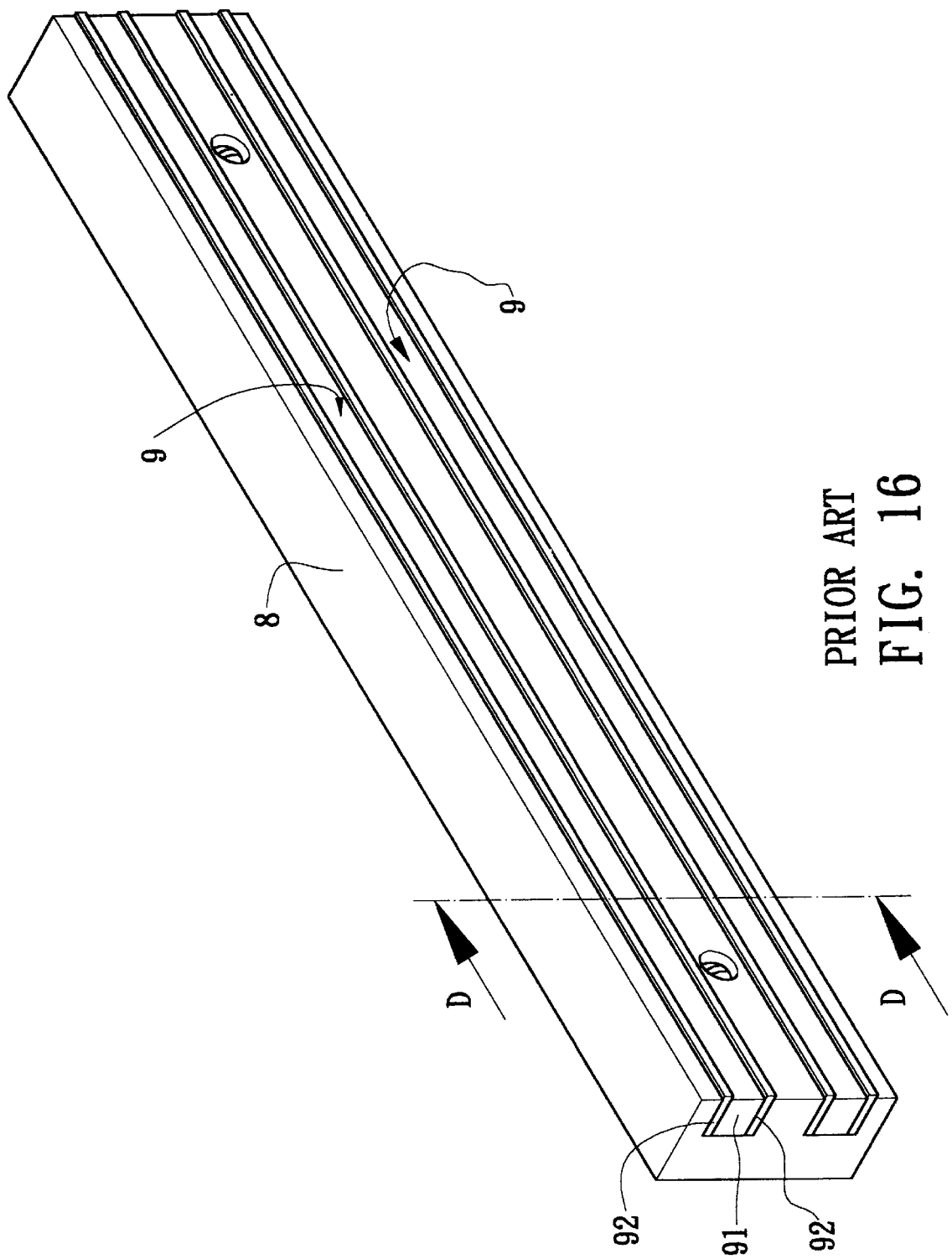
FIG. 16 is a perspective assembled view of the conventional magnetic rack.
Figure 17:
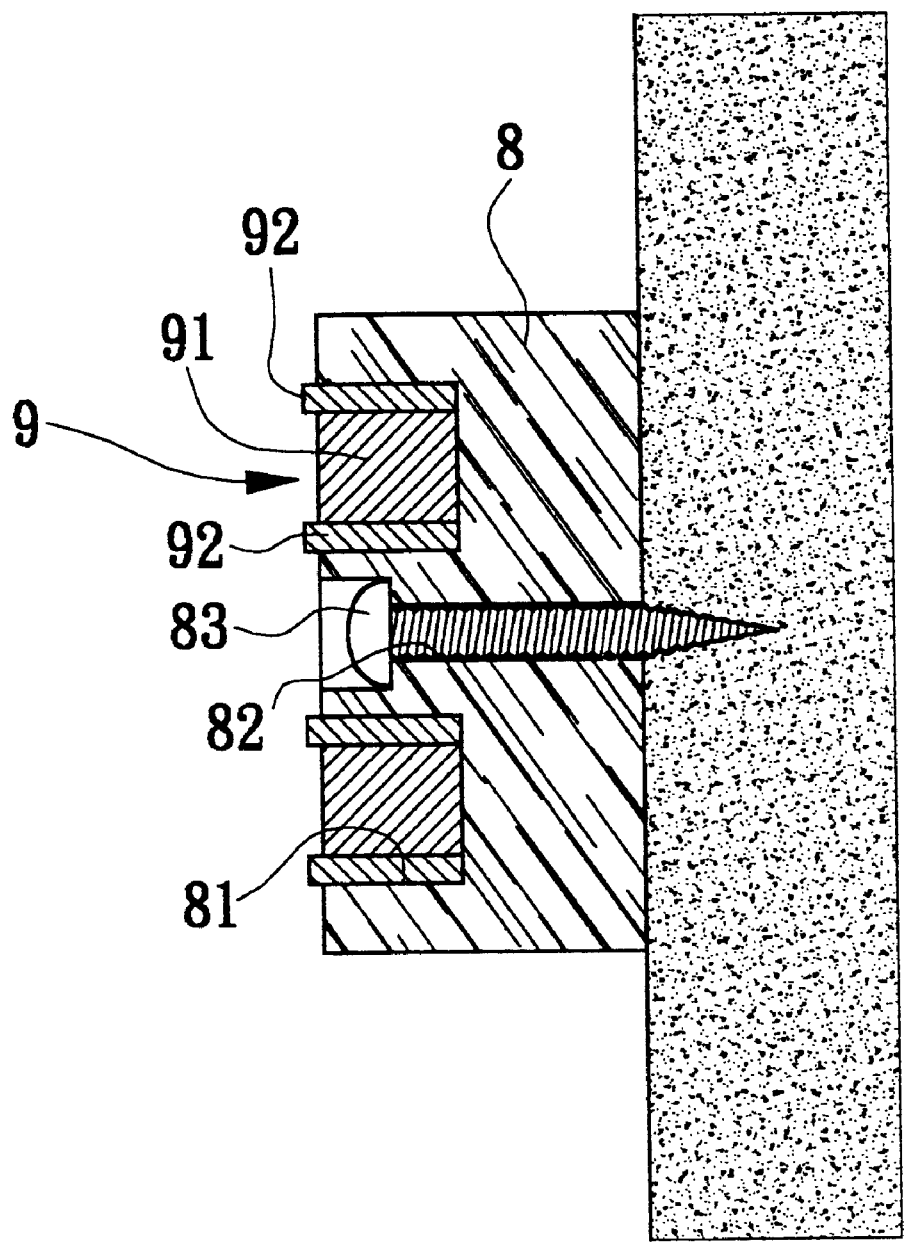
FIG. 17 is a sectional view taken along line D—D of FIG. 16.

Please refer to FIGS. 1 to 4. According to a first embodiment, the magnetic rack of the present invention has a casing 1 formed with two internal receiving chambers 11 open to lower side. A magnetic unit 2 is received in each receiving chamber 11. The magnetic unit 2 is composed of a magnet 21 and two iron strips 22 respectively attracted by and attached to two sides of the magnet 21. Multiple non-magnetic pins 23 are passed through the magnet 21 and the iron strips 22. Each iron strip 22 has a waved projecting section 221 protruding from the magnet 21. In this embodiment, each of two ends of the projecting section 221 is formed with a notch 222. The top face of the receiving chamber 11 is formed with a slit 111 corresponding to each projecting section 221 of the iron strip 22, whereby only the projecting section 221 of the iron strip 22 outward protrudes from the casing 1 with the notch 222 of the iron strip 22 stopped by the casing 1. A bottom board 12 is fused on bottom face of the casing 1 by ultrasonic wave for enclosing and fixing the magnetic unit 2. The casing 1 and the bottom board 12 are formed with multiple corresponding through holes 13. The through holes 13 on two sides of the bottom board 12 are formed with recessed sections 14 in which two hook sections 31 of an article bracket 3 are inlaid. Bolts 15 are passed through the through holes 13 to lock the magnetic rack on a third article (such as a wall, a cabinet, etc.). The projecting sections 221 of the iron strips 22 serve to attract a cutting knife. After attracting the cutting knife, voids are defined between the waved projecting sections 221 and the cutting knife for draining the water remaining on the cutting knife. Therefore, the iron strips 22 and the cutting knife are prevented from rusting. In addition, an article such a chopping board can be placed on the article bracket 3 as shown in FIG. 5 to cover the cutting knife.

The magnetic units 2 are enclosed and fixed by the casing 1 and the bottom board 12 and only the projecting sections 221 of the iron strips 22 extend through the slits 111 to protrude from the casing 1. The notches 222 on two sides of the iron strips 22 are engaged with the casing 1 so as to firmly locate and fix the magnetic units 2 between the casing 1 and the bottom board 12 without using any adhesive. Therefore, it is easy to assemble the magnetic rack and the production efficiency is promoted. Only the projecting sections 221 of the iron strips 22 protrude from the casing 1 so that the appearance of the magnetic rack as a whole will not be affected. In addition, the casing 1 is made of plastic material so that it will not deform in a humid kitchen and the using life of the magnetic rack is prolonged.

FIGS. 6 to 9 show a second embodiment of the present invention, in which the iron strips 52 on two sides of the magnet 51 of the magnetic unit 5 are formed with multiple notches 522, whereby the iron strips 52 are formed with multiple segments of waved projecting sections 521. The receiving chamber 41 of the casing 4 is formed with multiple slits 411 respectively corresponding to the projecting sections 521, whereby the projecting sections 521 can extend through the slits 411 to protrude from the casing 4. One side of the bottom board 42 is formed with multiple trumpet holes 43 opposite to the casing 4. A sucker 44 is disposed in each trumpet hole 43. The sucker 44 is integrally formed with a thread section 441 passing through the trumpet hole 43 and extending to the casing 4. The casing 4 is formed with a perforation 401 corresponding to each sucker 44. A nut 45 screwed on the thread section 441 of the sucker 44 is passed through the perforation 401. The outer face of the nut 45 is formed with a driving hole 451. The inner diameter of the trumpet hole 43 is smaller than the diameter of the sucker 44, whereby when turning the nut 45 to drive the thread section 441 of the sucker 44 to move toward the casing 4, a projecting edge 431 of the trumpet hole 43 will abut against the sucker 44.

Prior to installing the magnetic rack, the nut 45 is first untightened with a tool to release the sucker 44. Then the suckers 44 suck and attach to a polished surface such as enameled tile. Then the nut 45 is tightened with a screwdriver to drive the thread section 441 of the sucker 44 to move toward the casing 4. The diameter of the trumpet hole 43 of the bottom board 42 is smaller than the outer diameter of the sucker 44 so that the projecting edge 431 of the trumpet hole 43 will abut against the sucker 44. At this time, the central portion of the sucker 44 is drawn by the thread section 441 and swells up. Therefore, the air in the sucker 44 is sucked to the central swelling portion and the periphery of the sucker 44 tightly sucks and attaches to the polished surface of the enameled tile without damaging the polished surface. Accordingly, the magnetic rack can be easily and firmly attached to a polished surface.

FIGS. 10 to 14 show a third embodiment of the present invention, in which the casing 6 is composed of a front cover 601 and a rear cover 602 symmetrical to each other. Each of the front and rear covers 601, 602 is formed with a receiving chamber 61 in which a magnetic unit 7 is received. The iron strips 72 on two sides of the magnet 71 of the magnetic unit 7 are formed with multiple notches 722, whereby the iron strips 72 are formed with multiple segments of waved projecting sections 721. The receiving chamber 61 of the casing 6 is formed with multiple slits 611 respectively corresponding to the projecting sections 721, whereby the projecting sections 721 can extend through the slits 611 to protrude from both the front and rear sides of the casing 6. A pad member 74 is disposed between the two magnetic units 7 received in the receiving chambers 61 of the front and rear covers 601, 602 for isolating the two magnetic units 7 from each other.

Each of the front and rear covers 601, 602 is formed with a receiving chamber 61 in which a magnetic unit 7 is received. The front and rear sides of the casing 6 are formed with multiple slits 611 respectively corresponding to the projecting sections 721, whereby the projecting sections 721 can extend through the slits 611 to protrude from both the front and rear sides of the casing 6. Therefore, the projecting sections 721 of one side of the magnetic rack can attract and attach to a steel or iron-made article such as a working bench or stainless steel kitchen cabinet. The projecting sections 721 can attract tools, screws or cutting knife. Accordingly, the magnetic rack can be firmly fixed on a steel or iron-made article.

The above embodiments are only used to illustrate the present invention, not intended to limit the scope thereof. Many modifications of the above embodiments can be made without departing from the spirit of the present invention.

What is claimed is:

1. A magnetic rack comprising a casing formed with over one internal receiving chamber in which a magnetic unit is received, the magnetic unit being composed of a magnet and two iron strips respectively attracted by and attached to two sides of the magnet, each iron strip having a projecting section protruding from the magnet, each projecting section having over one notch, the receiving chamber being formed with a slit corresponding to each projecting section of the iron strip, whereby only the projecting section of the iron strip outward protrudes from the casing, a bottom board being disposed on bottom face of the casing for enclosing and fixing the magnetic unit.

2. A magnetic rack as claimed in claim 1, wherein the casing and the bottom board are formed with multiple corresponding through holes for bolts to pass therethrough and lock the magnetic rack on a fixed article.

3. A magnetic rack as claimed in claim 1, wherein the bottom board is fused on the bottom face of the casing by ultrasonic wave.

4. A magnetic rack as claimed in claim 1, wherein multiple non-magnetic pins are passed through the magnet and the iron strips of the magnetic unit.

5. A magnetic rack as claimed in claim 1, wherein the projecting section of the iron strip is waved.

6. A magnetic rack as claimed in claim 2, wherein the through holes on two sides of the bottom board are formed with recessed sections in which two hook sections of an article bracket are inlaid, bolts being passed through the through holes and the hook sections to lock the magnetic rack on a fixed article.

7. A magnetic rack as claimed in claim 1, wherein one side of the bottom board. is formed with multiple trumpet holes opposite to the casing, a sucker being disposed in each trumpet hole, the sucker being integrally formed with a thread section passing through the trumpet hole and extending to the casing, the casing being disposed with multiple nuts respectively screwed on the thread sections of the suckers, an inner diameter of the trumpet hole being smaller than the diameter of the sucker, whereby when turning the nut to drive the thread section of the sucker to move toward the casing, a projecting edge of the trumpet hole will abut against the sucker.

8. A magnetic rack as claimed in claim 1, wherein the casing is composed of a front cover and a rear cover symmetrical to each other, each of the front and rear covers being formed with a receiving chamber in which a magnetic unit is received, whereby the projecting sections of the magnetic units protrude from both the front and rear sides of the casing.

9. A magnetic rack as claimed in claim 8, wherein a pad member is disposed between the two magnetic units received in the receiving chambers of the front and rear covers for isolating the two magnetic units from each other.

* * * * *